Figure 3:
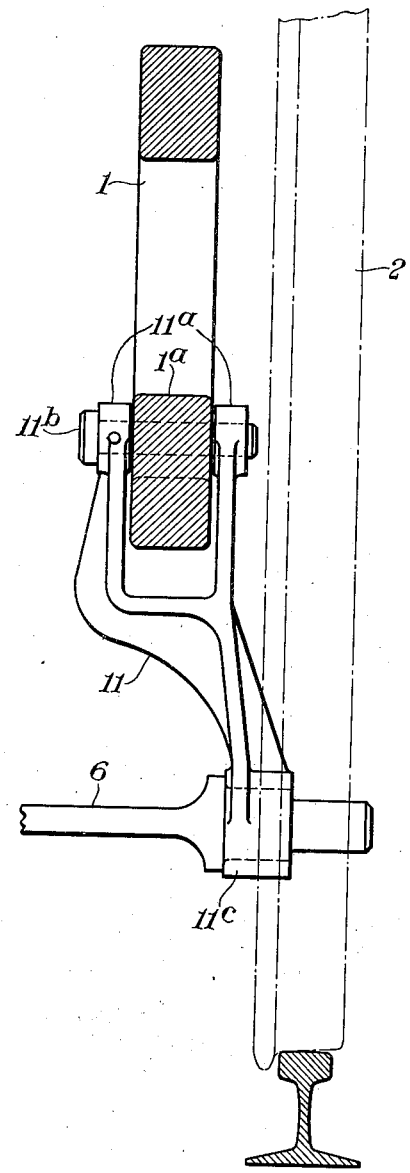

Feb. 22, 1938.    W. A. GANTNER ET AL    2,109,194
BRAKE MECHANISM
Filed May 12, 1937    2 Sheets-Sheet 1
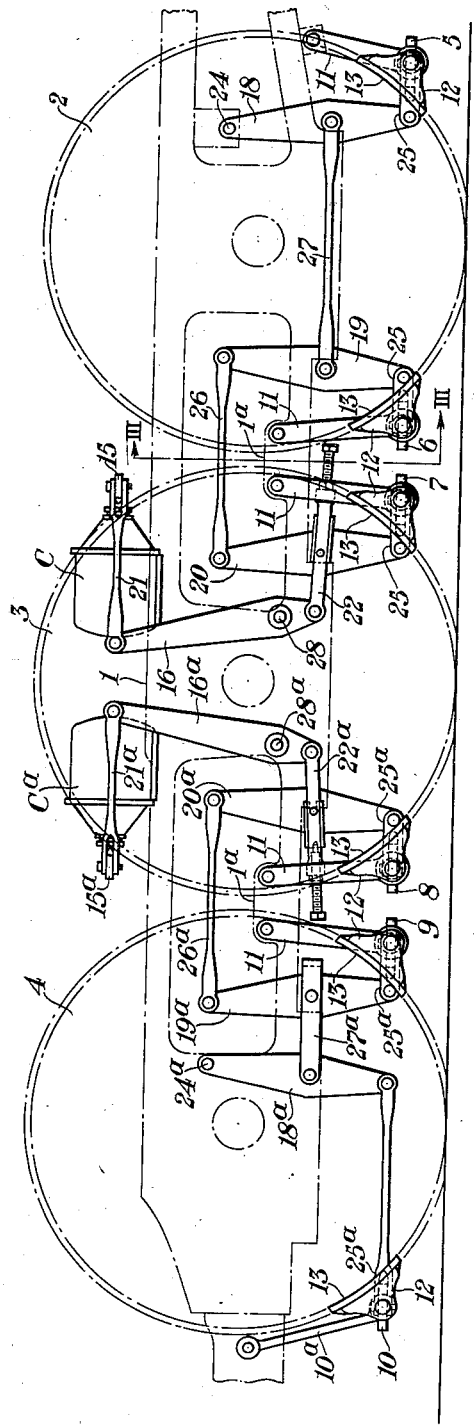
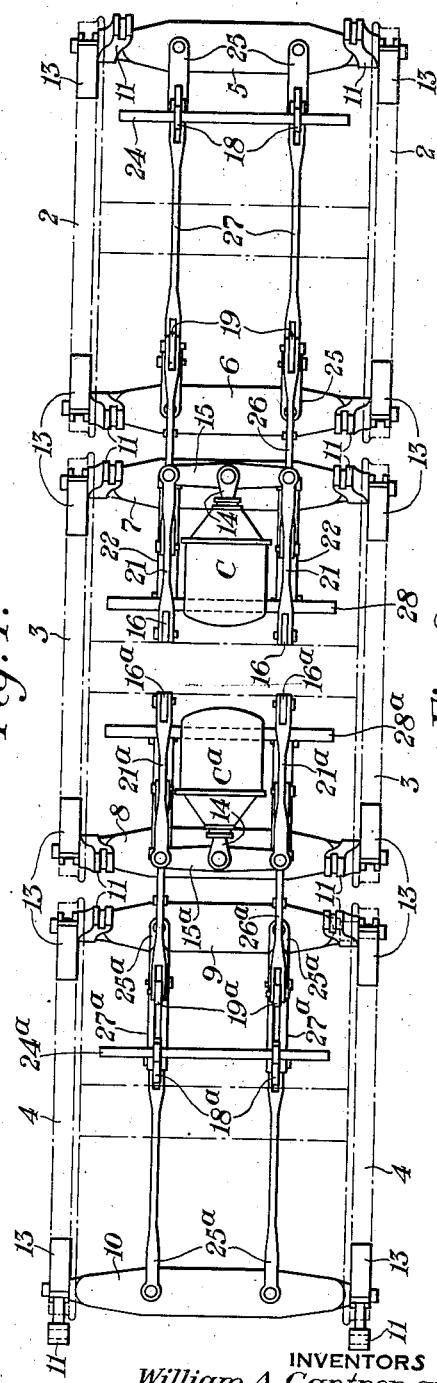
INVENTORS
William A. Gantner and
Thomas R. McGowan.
BY
THEIR ATTORNEY Patented Feb. 22, 1938

2,109,194

UNITED STATES PATENT OFFICE 2,109,194

BRAKE MECHANISM

William A. Gantner, Wilkinsburg, and Thomas R. McGowan, Pittsburgh, Pa., assignors to The American Brake Company, Swissvale, Pa., a corporation of Missouri Application May 12, 1937, Serial No. 142,194

11 Claims. (Cl. 188—46)

Our invention relates to brake mechanism for railway vehicles, and particularly to brake mechanism for applying clasp brakes to the driving wheels of locomotives.

We shall describe one form of brake mechanism embodying our invention, and shall then point out the novel features thereof in claims.

In the accompanying drawings, Fig. 1 is a side view, partly diagrammatic, showing brake mechanism embodying our invention applied to the driving wheels of a locomotive of the type having three pairs of driving wheels. Fig. 2 is a top plan view of the brake mechanism shown in Fig. 1. Fig. 3 is a fragmentary sectional view taken substantially on the line III—III of Fig. 1.

Similar reference characters refer to similar parts in all three views.

Referring to the drawings, we have here shown brake mechanism embodying our invention applied to a locomotive having a frame 1 supported by three pairs of driving wheels 2, 3, and 4.

The brake mechanism comprises brake beams 5 and 6 disposed at the forward and rear sides, respectively, of the wheels 2; brake beams 7 and 8 disposed at the forward and rear sides, respectively, of the wheels 3; and brake beams 9 and 10 disposed at the forward and rear sides, respectively, of the wheels 4. Each brake beam is provided at each end with a brake head 12 to which a brake shoe 13 is secured for engagement with the tread of the adjacent wheels 2, 3, and 4.

The brake beam 10 is movably supported adjacent its ends from the frame 1 by means of the usual hangers 10ª, and each of the remaining brake beams is supported adjacent its ends from the frame 1 by means of special hangers 11, the construction of one of which is illustrated in Fig. 3. Referring to Fig. 3, the hanger 11 here shown is provided with a forked or bifurcated upper end 11ª which straddles the lower frame rail, and a supporting lug 1ª formed on the upper side of the lower frame rail, and is pivotally attached to the supporting lug 1ª by means of a pin 11ᵇ extending through the supporting lug and through the bifurcations of the hanger. The lower end of the hanger 11 is formed with an offset portion 11ᶜ which projects partway into the plane of the wheels and pivotally receives the adjacent rounded end of the associated brake beam in supporting relation thereto.

One advantage of a hanger constructed in the manner described is that since the upper end of the hanger is offset from the lower end in the manner described, it is not necessary to space the wheels apart to provide clearance for the bearing supports for the hangers. This is a particular advantage where clasp brakes are provided, since it is desirable that the driving wheels of locomotives should be located as closely together as is possible to facilitate the negotiation of curves by the locomotive, and if the type of hanger usually provided were employed it would be necessary to space the wheels apart far enough to provide room for two hanger bearings between the wheels.

Another advantage of a hanger constructed in the manner described is that since the upper or bearing portion of the hanger is forked in the manner shown, the portion of each hanger which is located between the frame and the adjacent wheel can be made sufficiently narrow to provide ample clearance, and at the same time enable the bearing to be of sufficient size to take care of the large braking loads to which the hangers are subjected.

The brake beams 5, 6, and 7 are actuated, through the medium of a first set of interconnected rods and levers, by a first brake cylinder C, and the brake beams 8, 9, and 10 are actuated, through the medium of a second set of interconnected rods and levers, by a second brake cylinder Cª. These brake cylinders are secured to the locomotive frame 1 adjacent its center in any suitable manner not shown, and are preferably disposed with their axes parallel to the longitudinal center line of the locomotive frame. The two brake cylinders are of the usual type, and each cylinder includes the usual cylinder body, hollow piston (not shown) normally held in a retracted position by a release spring (not shown), and a push rod 14 operatively connected with the associated piston.

The set of operatively connected rods and levers for actuating the brake beams 5, 6, and 7 includes an equalizing lever 15, a vertically disposed brake cylinder lever 16 disposed at each side of the locomotive, a dead lever 18 disposed at each side of the locomotive, and two live levers 19 and 20 disposed at each side of the locomotive.

The equalizing lever 15 is pivotally connected at or near its center with the push rod 14 of the brake cylinder C, and is operatively connected at its ends by means of links 21 with the upper ends of the two brake cylinder levers 16.

The brake cylinder levers 16, in turn, are pivotally supported intermediate their ends on a cross tie 28, and are operatively connected at their lower ends with the live levers 20 by means of pull rods 22. The cross tie 28 is adapted to be mounted in suitable supports (not shown) provided on the engine frame 1. Each of the pull rods 22 is provided at the end which is connected with the associated floating lever 20 with a slack adjuster of well-known construction.

The dead levers 18 are pivotally mounted at their upper ends on a cross tie 24, and are operatively connected at their lower ends with the brake beam 5 adjacent its opposite ends by means of double jaws 25. The live levers 19 and 20 are pivotally connected at their lower ends with the brake beams 6 and 7 by means of double jaws 25, and are connected together at their upper ends by a rod 26. The live levers 19 and dead levers 18 are operatively connected together intermediate their ends by a rod 27. The cross tie 24 is secured at its ends to the locomotive frame in any suitable manner not shown.

The set of operatively connected rods and levers for actuating the brake beams 8, 9, and 10 is similar to that for actuating the brake beams 5, 6, and 7, and the parts of the set of rods and levers for operating the brake beams 8, 9, and 10 have accordingly been designated by the same reference characters as the corresponding parts of the set for operating the brake beams 5, 6, and 7, but with the distinguishing exponent $a$ added thereto. It is believed, therefore, that the construction of the set of rods and levers for actuating the brake beams 8, 9, and 10 will be apparent from an inspection of the drawings, and from the foregoing description, without further detailed description.

In operation, when fluid under pressure is supplied to the brake cylinders C and $C^a$, the associated push rods 14 are forced outwardly in the cylinders, and this outward movement of the push rods acts through the equalizing levers 15 and $15^a$, the links 21 and $21^a$, the brake cylinder levers 16 and $16^a$, the live levers 19, 20, $19^a$, and $20^a$, the dead levers 18 and $18^a$, and brake beams 5, 6, 7, 8, 9, and 10 to apply the brake shoes 13 to the treads of the wheels.

To release the brakes, the fluid which was applied to the brake cylinders C and $C^a$ to apply the brakes is released from these cylinders in the usual manner, whereupon the release springs disposed in the brake cylinders act through the medium of the two sets of interconnected rods and levers to move the brake beams, and hence the brake shoes, to their released positions.

One advantage of brake mechanism embodying our invention is that the parts at both ends of the locomotive are similar, thus greatly facilitating the manufacture of the parts.

Another advantage of brake mechanism embodying our invention is that the minimum number of different kinds of parts are required, which fact enables the brake mechanism to be manufactured at a minimum cost.

Another advantage of brake mechanism embodying our invention is that all of the parts can be mounted where they are free from interference with or from adjacent parts of the locomotive.

Although we have herein shown and described only one form of brake mechanism embodying our invention, it is understood that various changes and modifications may be made therein within the scope of the appended claims without departing from the spirit and scope of our invention.

Having thus described our invention, what we claim is:

1. In a brake mechanism for a vehicle having a plurality of pairs of wheels, first and second brake beams applied to opposite sides of one pair of wheels and a third brake beam applied to the side of an adjacent pair of wheels nearest to said first pair, a pair of dead levers operatively connected at their lower ends with said first brake beam adjacent its opposite ends, a first pair of live levers operatively connected at their lower ends with said second brake beam adjacent its opposite ends and operatively connected intermediate their ends with said dead levers, a second pair of live levers operatively connected at their lower ends with said third brake beam adjacent its opposite ends and at their upper ends with the live levers of said first pair, a brake cylinder, and an equalizing lever operatively connected intermediate its ends with said brake cylinder and at its opposite ends with the live levers of said second pair intermediate their ends.

2. In a brake mechanism for a vehicle having a plurality of pairs of wheels, first and second brake beams applied to opposite sides of one pair of wheels and a third brake beam applied to the side of an adjacent pair of wheels nearest to said first pair, a pair of dead levers operatively connected at their lower ends with said first brake beam adjacent its opposite ends, a first pair of live levers operatively connected at their lower ends with said second brake beam adjacent its opposite ends and operatively connected intermediate their ends with said dead levers, a second pair of live levers operatively connected at their lower ends with said third brake beam adjacent its opposite ends and at their upper ends with the live levers of said first pair, a pair of brake cylinder levers pivotally supported intermediate their ends and operatively connected at their lower ends with the live levers of said second pair intermediate their ends, a brake cylinder, and an equalizing lever operatively connected intermediate its ends with said brake cylinder and at its opposite ends with the upper ends of said brake cylinder levers.

3. In a brake mechanism for a vehicle having a plurality of pairs of wheels, a first and a second brake beam applied to opposite sides of one pair of wheels and a third brake beam applied to the side of an adjacent pair of wheels nearest to said first pair, a pair of dead levers operatively connected at their lower ends with said first brake beam, a first pair of live levers connected at their lower ends with said second brake beam, a second pair of live levers connected at their lower ends with said third brake beam, pull rods connecting said dead levers with the live levers of said first pair intermediate their ends, other pull rods connecting said two pairs of live levers at their upper ends, brake cylinder levers pivotally supported intermediate their ends and operatively connected at their lower ends with the live levers of said second pair intermediate their ends, an equalizing lever operatively connected at its ends with the upper ends of said brake cylinder levers, and a brake cylinder connected with said equalizing lever intermediate its ends.

4. A brake mechanism for a vehicle having three pairs of wheels comprising, first and second brake beams disposed on opposite sides of the one pair of wheels, third and fourth brake beams disposed on opposite sides of the intermediate pair of wheels, and fifth and sixth brake beams disposed on opposite sides of the remaining pair of wheels; a first pair of dead levers connected at their lower ends with said first brake beam, a first pair of live levers operatively connected intermediate their ends with the dead levers of said first pair and operatively connected at their lower ends with said second brake beam, a second pair of live levers operatively connected at their upper ends with the upper ends of the live levers of said first pair and at their lower ends with said third brake beam, a first pair of brake cylinder levers pivotally supported intermediate their ends and operatively connected at their lower ends with the live levers of said second pair intermediate their ends, a first brake cylinder, a first equalizing lever operatively connected intermediate its ends with said first brake cylinder and at its ends with the upper ends of the brake cylinder levers of said first pair, a second pair of dead levers operatively connected at their lower ends with said sixth brake beam, a third pair of live levers operatively connected intermediate their ends with the dead levers of said second pair and at their lower ends with said fifth brake beam, a fourth pair of live levers operatively connected at their upper ends with the live levers of said third pair and at their lower ends with said fourth brake beam, a second pair of brake cylinder levers pivotally supported intermediate their ends and operatively connected at their lower ends with the live levers of said fourth pair intermediate their ends, a second brake cylinder, and a second equalizing lever operatively connected intermediate its ends with said second brake cylinder and at its ends with the upper ends of the brake cylinder levers of said second pair.

5. In a brake mechanism for a vehicle having at least one pair of wheels, a brake beam extending transversely of the vehicle below the horizontal plane passing through the axis of the wheels and provided at each end with a rounded portion carrying a brake head provided with a brake shoe for engagement with the associated wheels, and two hangers for supporting said brake beam disposed at the opposite sides of the vehicle, each said hanger being provided with a bifurcated upper end which is pivotally attached to a supporting member between the planes of the wheels and with an offset portion at its lower end which extends partway into the plane of the adjacent wheels and pivotally receives the rounded end of the brake beam.

6. In a brake mechanism for a vehicle having at least one pair of wheels, a brake beam extending transversely of the vehicle below the horizontal plane passing through the axis of the wheels and provided at each end with a rounded portion carrying a brake head provided with a brake shoe for engagement with the associated wheel, two hangers for supporting said brake beam disposed at the opposite sides of the vehicle, each said hanger being provided with a bifurcated upper end which is pivotally attached to a supporting member between the planes of the wheels and with an offset portion at its lower end which extends part-way into the plane of the adjacent wheels and pivotally receives the rounded end of the brake beam, and means for actuating said brake beam to cause said brake shoes to frictionally engage the associated wheels.

7. In a brake mechanism for a vehicle having at least two pairs of wheels located closely together, two brake beams extending transversely of the vehicle between said two pairs of wheels and each carrying a brake shoe at each end, the shoes carried by one beam being adapted to cooperate with the wheels of one pair and the shoes carried by the other beam being adapted to cooperate with the wheels of the other pair, and two hangers for supporting each beam disposed at the opposite ends of the beam, each said hanger being provided with a bifurcated upper end which is pivotally attached to a supporting member between the planes of the wheels and with an offset portion at its lower end which extends partway into the plane of the adjacent wheels and pivotally receives the adjacent end of the associated beam.

8. In a brake mechanism for a vehicle having at least two pairs of wheels located closely together, two brake beams extending transversely of the vehicle between said two pairs of wheels and each carrying a brake shoe at each end, the shoes carried by one beam being adapted to cooperate with the wheels of one pair and the shoes carried by the other beam being adapted to cooperate with the wheels of the other pair, two hangers for supporting each beam disposed at the opposite ends of the beam, each said hanger being provided with a bifurcated upper end which is pivotally attached to a supporting member between the planes of the wheels and with an offset portion at its lower end which extends partway into the plane of the adjacent wheels and pivotally receives the adjacent end of the associated beam, and means for actuating said brake beams to cause said brake shoes to frictionally engage the associated wheels.

9. In a brake mechanism for a vehicle having a plurality of pairs of wheels, first and second brake beams applied to opposite sides of one pair of wheels and a third brake beam applied to the side of an adjacent pair of wheels nearest to said first pair, two hangers for supporting each brake beam located at opposite sides of the vehicle, each said hanger being provided with a bifurcated upper end which is pivotally attached to a supporting member between the planes of the wheels and with an offset portion at its lower end which extends partway into the plane of the adjacent wheels and pivotally receives the adjacent end of the associated beam, a pair of dead levers operatively connected at their lower ends with said first brake beam adjacent its opposite ends, a first pair of live levers operatively connected at their lower ends with said second brake beam adjacent its opposite ends and operatively connected intermediate their ends with said dead levers, a second pair of live levers operatively connected at their lower ends with said third brake beam adjacent its opposite ends and at their upper ends with the live levers of said first pair, a brake cylinder, and an equalizing lever operatively connected intermediate its ends with said brake cylinder and at its opposite ends with the live levers of said second pair intermediate their ends.

10. In a brake mechanism for a vehicle having a plurality of pairs of wheels, first and second brake beams applied to opposite sides of one pair of wheels and a third brake beam applied to the side of an adjacent pair of wheels nearest to said first pair, two hangers for supporting each brake beam located at opposite sides of the vehicle, each said hanger being provided with a bifurcated upper end which is pivotally attached to a supporting member between the planes of the wheels and with an offset portion at its lower end which extends partway into the plane of the adjacent wheels and pivotally receives the adjacent end of the associated beam, a pair of dead levers operatively connected at their lower ends with said first brake beam adjacent its opposite ends, a first pair of live levers operatively connected at their lower ends with said second brake beam adjacent its opposite ends and operatively connected intermediate their ends with said dead levers, a second pair of live levers operatively connected at their lower ends with said third brake beam adjacent its opposite ends and at their upper ends with the live levers of said first pair, a pair of brake cylinder levers pivotally supported intermediate their ends and operatively connected at their lower ends with the live levers of said second pair intermediate their ends, a brake cylinder, and an equalizing lever operatively connected intermediate its ends with said brake cylinder and at its opposite ends with the upper ends of said brake cylinder levers.

11. In a brake mechanism for a vehicle having a plurality of pairs of wheels, a first and a second brake beam applied to opposite sides of one pair of wheels and a third brake beam applied to the side of an adjacent pair of wheels nearest to said first pair, two hangers for supporting each brake beam located at opposite sides of the vehicle, each said hanger being provided with a bifurcated upper end which is pivotally attached to a supporting member between the planes of the wheels and with an offset portion at its lower end which extends partway into the plane of the adjacent wheels and pivotally receives the adjacent end of the associated beam, a pair of dead levers operatively connected at their lower ends with said first brake beam, a first pair of live levers connected at their lower ends with said second brake beam, a second pair of live levers connected at their lower ends with said third brake beam, pull rods connecting said dead levers with the live levers of said first pair intermediate their ends, other pull rods connecting said two pairs of live levers at their upper ends, brake cylinder levers pivotally supported intermediate their ends and operatively connected at their lower ends with the live levers of said second pair intermediate their ends, an equalizing lever operatively connected at its ends with the upper ends of said brake cylinder levers, and a brake cylinder connected with said equalizing lever intermediate its ends.

WILLIAM A. GANTNER.
THOMAS R. McGOWAN.